3,062,847
STEROIDAL AZINES

Pietro de Ruggieri, Milan, Italy, assignor to Ormonoterapia Richter S.p.A., Milan, Italy, a corporation of Italy
No Drawing. Filed Jan. 17, 1962, Ser. No. 166,952
Claims priority, application Italy Nov. 23, 1961
12 Claims. (Cl. 260—397.5)

The object of this invention is the preparation of compounds that can be represented by the following general formula:

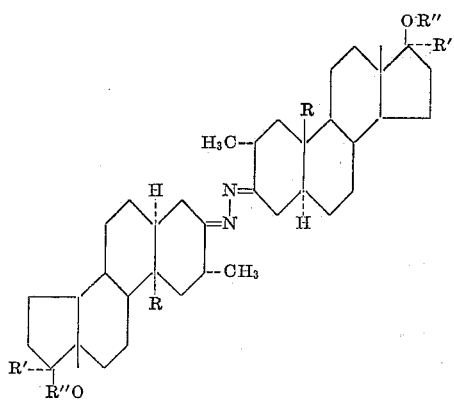

wherein R and R' are members selected from the group consisting of H and CH₃ while R'' is a member selected from the group consisting of H and an aliphatic acyl radical containing from 2 to 10 C atoms. These compounds are very useful as anabolic agents because of their favorable anabolic-androgenic ratio and because of the nitrogen retention they afford. They are prepared from the corresponding 3-hydrazones that are described in the pending application Serial No. 145,481, filed October 16, 1961, either by dissolving them in one of several solvents and allowing the solution to stand, or by a heat-treatment. It is well known to the organic chemist that hydrazones are thus converted into azines. Obviously, other methods which are commonly followed for the preparation of azines can be employed as well. Such methods are for instance the reaction between 2 moles of a ketone and 1 mole of hydrazine hydrate, or the reaction between 1 mole of a hydrazone and 1 mole of a ketone. However, dissolving the hydrazone in chloroform or in another solvent and allowing this solution to stand for a while is an easier method, and it is therefore to be preferred.

The 17β acyl derivatives can be prepared directly from 3-hydrazones that have been previously acylated in their 17 position, or from the azines, through acylation with the usual methods.

The following examples are given only for the purpose of further illustrating our invention, and they are not to be construed as limiting the scope of the present invention in any way:

EXAMPLE NO. 1
2α-Methyl-5α-Androstane-17β-ol-3-One-Azine 0.7 part of 2α-methyl-5α-androstane-17β-ol-3-hydrazone is refluxed for 3 hours with 0.3 part of 2α-methyl-5α-androstane-17β-ol-3-one dissolved in 10 parts of absolute alcohol. After evaporation to dryness, the product is recrystallized from methanol. The yield is 0.65 part of 2α - methyl - 5α - androstane-17β-ol-3-one-azine, having M.P.=238–239° C. and $(\alpha)_D=+129°$ (chloroform).

EXAMPLE NO. 2
2α,17α-Dimethyl-5α-Androstane-17β-ol-3-One-Azine 2 parts of 2α,17α-dimethyl-5α-androstane-17β-ol-3-hydrazone are dissolved in 10 parts of chloroform and the solution is kept at room temperature for 24 hours. It is then evaporated to dryness and the product is recrystallized from methanol. The yield is 1.95 parts of 2α,17α-dimethyl-5α-androstane-17β-ol-3-azine, having

M.P.=265–267° C.

and $(\alpha)_D=+116°$ (chloroform).

EXAMPLE NO. 3
2α-Methyl-5α-Estrane-17β-ol-3-One-Azine 5.8 parts of 2α-methyl-5α-estrane-17β-ol-3-one, dissolved in 58 parts of ethanol, are refluxed for 3 hours with 0.65 part of hydrazine hydrate. After partial evaporation, water is added, and the product is collected by filtration. It is then recrystallized from methanol. The yield is 4.2 parts of 2α-methyl-5α-estrane-17β-ol-3-azine, having M.P.=234–236° C. and $(\alpha)_D=+112°$ (chloroform).

EXAMPLE NO. 4
2α,17α-Dimethyl-5-Estrane-17β-ol-3 One-Azine 2 parts of 2α,17α-dimethyl-5α-estrane-17β-ol-3-hydrazone are refluxed for 3 hours with 10 parts of ethyl acetate. After evaporation to dryness, the product is recrystallized from methanol. The yield is 1.95 parts of 2α,17α-dimethyl-5α-estrane-17β-ol-3-one-azine, having

M.P.=242–243° C.

and $(\alpha)_D=+100°$ (chloroform).

EXAMPLE NO. 5
2α-Methyl-17β-Acetoxy-5α-Androstane-3-One-Azine 2 parts of 2α-methyl-17β-acetoxy-5α-androstane 3-hydrazone are dissolved in 10 parts of chloroform and the solution is allowed to stand for 24 hours. It is then evaporated to dryness and the product is recrystallized from methanol. The yield is 1.9 parts of 2α-methyl-17β-acetoxy-5α-androstane-3-one-azine, having

M.P.=267–269° C.

and $(\alpha)_D=+95°$ (chloroform).

EXAMPLE NO. 6
2α-Methyl-5α-Androstane-17β-Propionyloxy-3-One-Azine 3 parts of propionic anhydride are added to 1 part of 2α-methyl-5α-androstane-17β-ol-3-azine dissolved in 6 parts of pyridine. After standing for 12 hours at room temperature, water is added and the product is collected by filtration and recrystallized from methanol. The yield is 1.05 parts of 2α-methyl-5α-androstane-17β-propionyloxy-3-one-azine, having M.P.=249–251° C. and $(\alpha)_D=+124°$ (chloroform).

EXAMPLE NO. 7
2α-Methyl-5α-Androstane-17β-Hexanoyloxy-3-One-Azine 0.8 part of 2α-methyl-5α-androstane-17β-hexanoyloxy-3-hydrazone is refluxed for 4 hours with chloroform. After evaporation to dryness, the product is recrystallized from methanol. The yield is 0.65 part of 2α-methyl-5α-androstane-17β-hexanoyloxy-3-one-azine, having

M.P.=240–242° C.

and $(\alpha)_D=+114°$ (chloroform).

EXAMPLE No. 8

2α-Methyl-17β-Heptanoyloxy-5α-Androstane-3-One-Azine 2 parts of 2α-methyl-5α-androstane-17β-ol-3-one-azine dissolved in 4 parts of pyridine are refluxed for 2 hours with 2 parts of enanthic anhydride. Water is then added and the solvent is steam distilled. The product is extracted with chloroform, and the chloroform solution is evaporated to dryness. The product is then recrystallized from methanol. The yield is 2.1 parts of 2α-methyl-17β-heptanoyloxy - 5α - androstane - 3 - one - azine, having M.P.=206–208° C. and $(\alpha)_D$=+112° (chloroform).

EXAMPLE NO. 9

2α-Methyl-5α-Androstane-17β-Decanoyloxy-3-One-Azine 2 parts of 2α-methyl-5α-androstane-17β-decanoyloxy-3-hydrazone are refluxed for 6 hours with 5 parts of absolute alcohol. After evaporation to dryness, the product is recrystallized from methanol. The yield is 1.75 parts of 2α - methyl-5α-androstane-17β-decanoyloxy-3-one-azine, having M.P.=194–196° C. and $(\alpha)_D$=+140° (chloroform).

EXAMPLE NO. 10

2α-Methyl-5α-Estrane-17β-Propionyloxy-3-One-Azine 1 parts of 2α-methyl-5α-estrane-17β-ol-3-one-azine dissolved in 3 parts of pyridine is added with 1.5 parts of propionic anhydride. After standing overnight at room temperature, water is added and the product is collected by filtration. It is then recrystallised from methanol. The yield is 1.05 parts of 2α-methyl-5α-estrane-17α-propionyloxy-3-one-azine, having M.P.=241–243° C. and $(\alpha)_D$=+100° (chloroform).

EXAMPLE NO. 11

2α-Methyl-5α-Estrane-17β-Heptanoyloxy-3-One-Azine 0.6 part of 2α-methyl-5α-estrane-17β-heptanoyloxy-3-hydrazone is dissolved in 20 parts of chloroform and kept for 12 hours at room temperature.

After evaporation to dryness, the product is recrystallized from methanol. The yield is 0.52 part of 2α-methyl-5α-estrane-17β-heptanoyloxy-3-one-azine, having M.P.=247–250° C. and $(\alpha)_D$=+120° (chloroform)

I claim:

1. A compound of the formula:

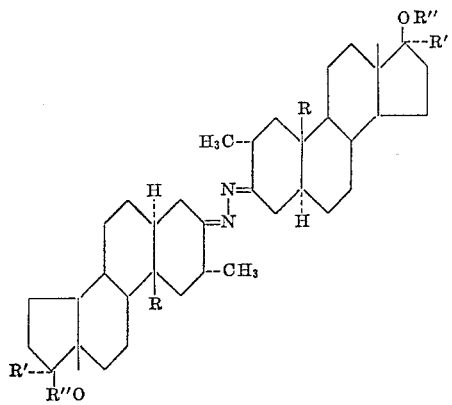

wherein R and R' are members selected from the group consisting of H and $CH_3$ and R" is a member selected from the group consisting of H and an aliphatic acyl radical containing from 2 to 10 C atoms.

2. 2α-methyl-5α-androstane-17β-ol-3-one-azine.
3. 2α-17α-dimethyl-5α-androstane-17β-ol-3-one-azine.
4. 2α-methyl-5α-estrane-17β-ol-3-one azine.
5. 2α, 17α-dimethyl-5α-estrane-17β-ol-3-one-azine.
6. 2α-methyl-17β-acetoxy-5α-androstane-3-one-azine.
7. 2α - methyl-17β-propionyloxy-5α-androstane-3-one-azine.
8. 2α - methyl - 17β-hexanoyloxy-5α-androstane-3-one-azine.
9. 2α - methyl-17β-heptanoyloxy-5α-androstane-3-one-azine.
10. 2α - methyl - 17β-decanoyloxy-5α-androstane-3-one-azine.
11. 2α - methyl - 17β-propionyloxy-5α-estrane-3-one-azine.
12. 2α - methyl - 17β-heptanoyloxy - 5α - estrane-3-one-azine.

No references cited.

UNITED STATES PATENT OFFICE
CERTIFICATE OF CORRECTION

Patent No. 3,062,847                           November 6, 1962

Pietro de Ruggieri

It is hereby certified that error appears in the above numbered patent requiring correction and that the said Letters Patent should read as corrected below.

Column 1, lines 14 to 30, and column 4, lines 5 to 21, th lower left-hand portion of the formula, each occurrence, should appear as shown below instead of as in the patent:

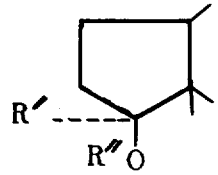

Signed and sealed this 3rd day of September 1963.
(SEAL)
Attest:

ERNEST W. SWIDER                          DAVID L. LADD
Attesting Officer                             Commissioner of Patents